United States Patent
Sinha et al.

(10) Patent No.: US 10,119,825 B1
(45) Date of Patent: Nov. 6, 2018

(54) SYSTEM AND METHOD FOR GEOCODING POSITIONAL ACCURACY

(71) Applicants: Nishant Sinha, Nolda (IN); Jeffrey Reuger, Pittsfield, MA (US); Ossama Essa, Clifton Park, NY (US); Neena Priyanka, Uttar Pradesh (IN); Berkley R Charlton, Frederick, CO (US)

(72) Inventors: Nishant Sinha, Nolda (IN); Jeffrey Reuger, Pittsfield, MA (US); Ossama Essa, Clifton Park, NY (US); Neena Priyanka, Uttar Pradesh (IN); Berkley R Charlton, Frederick, CO (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 15/690,325

(22) Filed: Aug. 30, 2017

(51) Int. Cl.
*G01C 21/32* (2006.01)
*G06F 17/30* (2006.01)

(52) U.S. Cl.
CPC ....... *G01C 21/32* (2013.01); *G06F 17/30241* (2013.01); *G06F 17/30371* (2013.01)

(58) Field of Classification Search
CPC ............... G01C 21/32; G06F 17/30241; G06F 17/30371
USPC .......................................................... 701/532
See application file for complete search history.

(56) References Cited

U.S. PATENT DOCUMENTS

| | | | | |
|---|---|---|---|---|
| 7,751,651 B2 * | 7/2010 | Oldroyd | ................. | G01C 11/00 382/103 |
| 2009/0254407 A1 * | 10/2009 | Fagan | .................... | G06Q 10/06 705/7.23 |

* cited by examiner

*Primary Examiner* — Tan Q Nguyen
(74) *Attorney, Agent, or Firm* — Brian A. Lemm; Charles R. Malandra, Jr.

(57) ABSTRACT

An automated computer geocoding system and method is described having a plurality of geographic datasets stored in a computer memory. The geographic datasets include at least one point level dataset, street level dataset, and geographic level dataset. As output, geocoded data is provided with positional accuracy indicators. In a first step, an address to be geocoded is received by the system. The system determines whether corresponding geocode data exists in one or more of the geographic datasets. A geographic dataset is selected that provides a highest level of resolution and that also includes corresponding geocode data for the address. A geocoded coordinate for the address is output, as found in the geographic dataset that was selected. An offset value for the geocoded coordinate is calculated and output with the coordinates. The offset value is determined as a function of geographic characteristics of the geographic dataset that was selected.

8 Claims, 4 Drawing Sheets

SYSTEM AND METHOD FOR GEOCODING POSITIONAL ACCURACY

FIELD OF THE INVENTION

The invention relates generally to the field of geocoding and more particularly to a method and apparatus for geocoding with improved positional accuracy.

BACKGROUND OF THE INVENTION

Geocoding involves programmatically assigning x and y coordinates (usually but not limited to, earth coordinates—i.e., latitude and longitude) to records, lists and files containing location information (full addresses, partial addresses, zip codes, census FIPS codes, etc.) for cartographic or any other form of spatial analysis or reference. Geocoding is even more broadly described as "mapping your data" in order to visualize information and explore relationships previously unavailable in strict database or spreadsheet analysis.

A centroid is a geographic center of an entire area, region, boundary, etc. for which the specific geographic area covers. Street vectors are address segments of individual streets, which may contain attributes such as address ranges. Street vectors can be used in displays of digitized computer-based street maps. Range information on street vectors is typically specified on the left and right side of each vector. They are also used for geocoding a particular address to a particular street segment based on its point along the line segment.

Geocoding is currently performed by running non-geocoded (referred to hereafter as "raw data") information such as a list of customers through proprietary software and/or data, which performs table lookup, fuzzy logic and address matching against an entire "library" of all known or available address points or street vectors (referred to hereafter as a "georeferenced library") with associated x, y location coordinates. If the raw data matches a point record from the georeferenced library, then the raw data is assigned the same x, y coordinates associated with the matching record from the georeferenced library. If the raw data instead matches a street vector, then the raw data is assigned interpolated x,y coordinates pair based on the x,y coordinates of the high and low address for the matched street vector in the georeferenced library.

The georeferenced library is compiled from a number of varied sources, depending on the territory, including census information, postal address information, street vectors with associated address ranges, postcode centroids and other various sources of data containing geographic information and/or location geometry. If a raw data address cannot be matched exactly to a specific library street address (known as a "street level hit"), then an attempt is made to match the raw data address to an ever decreasing precision geographic hierarchy of point, line or region geography until a predetermined tolerance for an acceptable match is met. The geographic hierarchy to which a raw data record is finally assigned is also known as the "geocoding precision." Geocoding precision tells how closely the location assigned by the geocoding software matches the true location of the raw data.

SUMMARY OF THE INVENTION

In accordance with the improved method and system described herein, an automated computer geocoding system has a plurality of geographic datasets stored in a computer memory. The geographic datasets include at least one point level dataset, at least one street level dataset, and at least one geographic level dataset. In this system and method, geocoded data is provided with positional accuracy indicators.

In a first step, an address (the "raw data") to be geocoded is received by the system. The system then determines whether corresponding geocode data exists in one or more of the geographic datasets. A geographic dataset is selected that provides a highest level of resolution, and that also includes corresponding geocode data for the address. A geocoded coordinate for the address is output, as found in the geographic dataset that was selected. An offset value for the geocoded coordinate is calculated and output with the coordinates. The offset value is determined as a function of geographic characteristics of the geographic dataset that was selected.

In a further preferred embodiment, when the geographic dataset selected in the selecting step is a point level dataset, the offset value is calculated as a function of a diagonal distance across a parcel that encompasses the geocoded coordinate. Also, when the geographic dataset is a street level (segment) dataset, the offset value is calculated as a function of a street segment length of a street segment that includes the geocoded coordinate. Finally, when the geographic dataset is a geographic level dataset, the offset value is calculated as a function of a diagonal distance across a defined geographic level region that includes the geocoded coordinate.

BRIEF DESCRIPTION OF THE DRAWINGS

Reference is now made to the various figures wherein like reference numerals designate similar items in the various views and in which.

DETAILED DESCRIPTION OF THE PREFERRED EMBODIMENT

Figure 1:
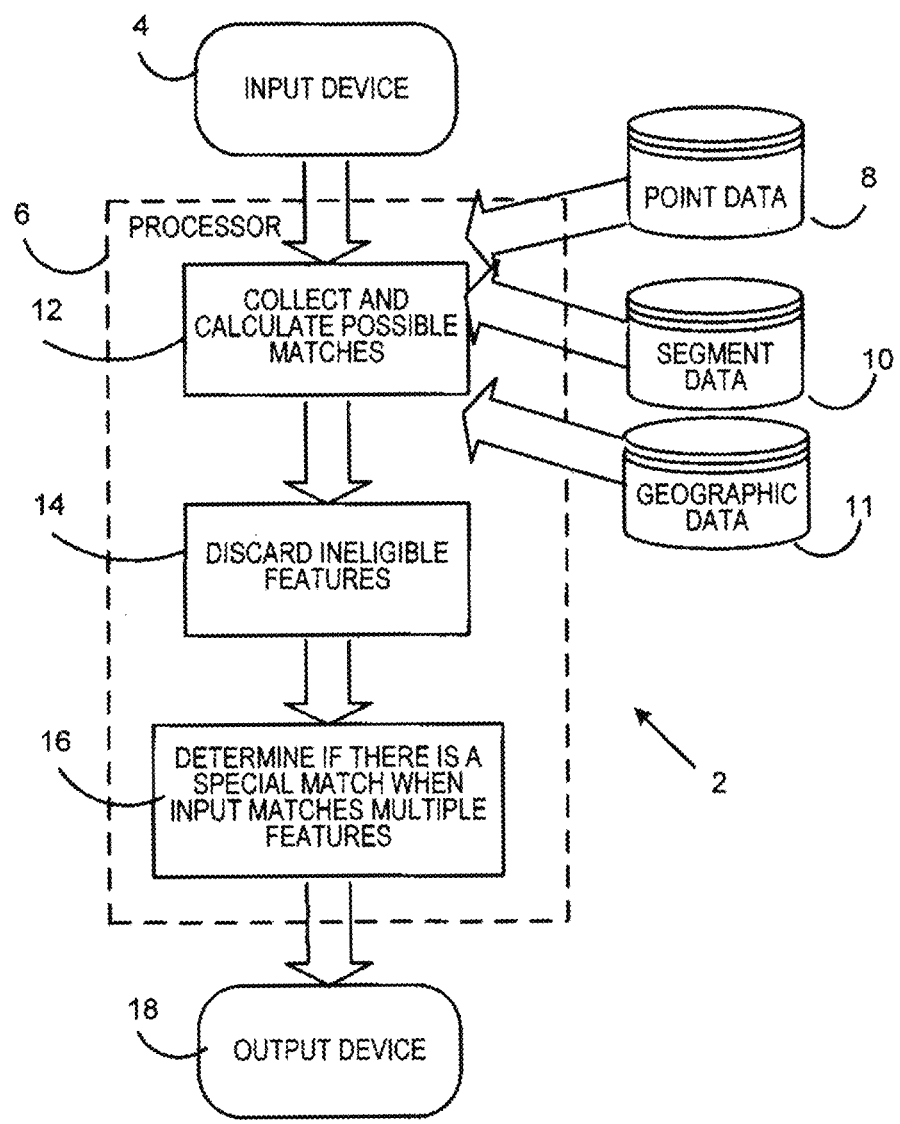
FIG. 1 is a block diagram of a geocoding system using combined street segments, point level datasets, and broader geographic datasets embodying the present invention.

Reference is now made to FIG. 1. A geocoding system 2 includes an input device 4. The input device 4 can be, for example, a keyboard or other input system. The input can also be from another module in a larger system that requires information from the geocoding system 2. The input device 4 is connected to a processor 6. The processor 6 is connected to operate in conjunction with a database 8 containing point data, a database 10 containing street segment data, and a database 11 containing general geographic data. General geographic data may include any kind of defined political, postal, regional, or natural area. For example, general geographic area data might include data describing cities, zip codes, national parks, or the like. The processor 6 contains a program store which causes the processor 6 to process information from both the database 8 and the database 10 and operate in the manner described herein. Input data is received from the input device 4 of the address for which corresponding geographic coordinates are wished to be known.

Point data in database 8 are datasets where a single latitude and longitude is provided for a specific address. Segment data in database 10 are datasets where a street segment line often as a street centerline is provided and interpolation is employed to relate the street centerline to a specific address for the address. Parity rules such as odd and even addresses lying on different sides of the street segment can also be employed.

The street segment centerline dataset in database 10 contains coordinates that describe the shape of each street and usually the range of house numbers found on each side of the street. The geocoding system 2 may compute a location for an address by linear interpolation of the street number with respect to the street address range. Other types of interpolation may also be used, such as squeeze distance (which might, for example, take into account a known characteristic that addresses are closer together at one end of the segment) and parity rules to determine a physical location for an address. The point level datasets in database 8 result in higher quality addresses accuracy than those requiring the interpolation technique. However, as previously noted, these point level datasets often do not contain every address and are therefore incomplete.

The geographic dataset in database 11 will typically include data describing the geographic boundaries of different regions. For example, it will might include the boundaries of different municipalities or zip code areas. If an address cannot be located in the point database 8 or the segment database 10, then a corresponding location may be assigned as being somewhere in a city, or zip code that is included in the address. Typically the corresponding location that is selected will be a centroid of that geographic area. Determination of a physical location by using this data will most often result in the biggest potential offset distance, but may still be useful for many purposes.

The segment data in database 10 is a group of street segments. Each street segment contains a group of latitudes and longitudes (i.e., a group of ordered points), and there is assumed to be a sub-street segment of the street in a straight line between the two points at the end of each street segment. A street segment must have at least two points, but can have many points. Most street segments contain a house number range (an address range) and reverse geocoding to a street segment works by interpolating the house number based on the house number range.

The point data in database 8 is a group of point data locations, which are, essentially, latitudes and longitudes of the rooftops of addresses. This data allows precise pinpointing of an address to an exact location, whereas the street segment data above requires interpolation. This is not necessary for a point data match. There is usually only one house number associated with a point in the point data. When there are multiple house numbers, it means the point is a feature such as a high rise building, in which case a convention may be implemented such as returning as a match the lowest available unit.

When calculating a house number (address) from a street segment, several other matters come into play. First, street segment records contain direction information, and the house number range data contains parity information. Direction indicates whether the house number ranges increase or decrease while traversing the set of ordered points. Parity indicates whether odd numbered houses are on the left side, the right side, or can not be determined. It is known if there is a house number range on the side of the street the input point is on. If there are no addresses on the side of the street the input point is on, the street segment is considered unranged for purposes of feature selection.

Where, for example, United States Postal Service (USPS) data is used, information is provided whether it can be determined which the side of the street the input point is on. If it is known that odds are on one side and evens are on the other, then a two house per street segment methodology is used. Otherwise, a one house per street segment methodology is used. Where it is known that odd addresses are on one side of a street segment and even addresses are on the other side of a street segment, the street segment is split up by the equation: (high house number minus low house number) divided by two. Where the odd and even addresses are not known to be on opposite sides of a street segment, the line street segment is split up by the equation: high house number minus low house number. In the second case, it is not possible to reliably select a house number whose parity (even or odd) matches the physical reality. In the first case, the interpolation may be off by a house number or two, but the parity will be correct.

The processor 6 processes point data from database 8, street segment data from database 10, and geographic data from database 11, by collecting and calculating possible matches, based on the input at the input device 4 at block 12. At block 14, processor 6 discards ineligible features from the collected and possible matched data. At block 16, the processor 6 determines if there is a special match when the input data matches multiple features. Finally, the processor 6 outputs the processed information to an output device 18. The output device 18 may be a monitor, a printer, or another output device, or an input to another module in a larger system. The desired output is typically a longitude and latitude for the inputted address. As will be further discussed below, in connection with FIG. 2, the output also preferably includes an indication of an offset distance that indicates the margin of error in which the actual location may be located based on the characteristics and granularity of the data.

With respect to offset position, it can be of interest for a user to know how close an address is to a boundary line for a region. For example, in an insurance application, it may be of interest to know whether an address is located on a flood plain. If an address is determined to be far from any flood region, the offset distance might not matter. But if the address is near the boundary of the flood region, then it will be of interest to know if that flood plain boundary is within the offset distance for the location identified for the address. If the boundary is within the distance of the offset, then the insurance adjuster may want to flag that client for a more detailed inquiry to ensure that the correct risk assessment is made.

Most locations, such as in U.S., are not critically located on or near borders of tax or risk areas. They are either comfortably inside or outside of the geographic area and hence, these locations do not require highly accurate positioning. The critical locations are those that reside on or near borders between differing risk areas. Those areas not only require accurate geo-positioning, but also effective information about positioning with respect to parcel/street segment/geographic boundaries to enable risk managers to know whether the margin of error that is embodied in the offset distance might result in the address actually being located on the other side of a meaningful boundary.

The embodiments described herein allow users to input address and determine geocoded location. Along with geocoded location, distance offset function will be considered dynamically at run-time when input addresses are being assigned latitude/longitude coordinates during the geocoding process. The distance offset function will determine the position of the geocoded location with respect to match geocoding level such as rooftop points, street line, postal or geographic boundaries. This capability provides positional estimates, and thus extend the geocoding capabilities via additional functions. As such, the embodiments of the invention solve a long-felt need by allowing risk managers to know of a likelihood of whether the geocoded location is in one or another area of interest.

In this regard, prior art geocoding methods fail to provide position of geocoded location with regard to parcel/street line/ or boundary polygons. To provide accurate position of geocoded location, a geocoder using the preferred embodiment can be equipped to calculate its relative position with respect to the maximum offset distance of the defined boundary/line along with geocoding process, without requiring much effort in an underlying georeferenced address dictionary.

U.S. Pat. No. U.S. 7,539,573, assigned to Pitney Bowes Software Inc. and incorporated herein by reference, considered the incorporation of ground truth data (when available) in conjunction with address range information for a given segment to achieve positional accuracy. That patent, however, does not disclose or suggest use of distance offset [diagonal distance or street segment distance] ability to provide accurate geo-position of a geocoded location.

Figure 2:
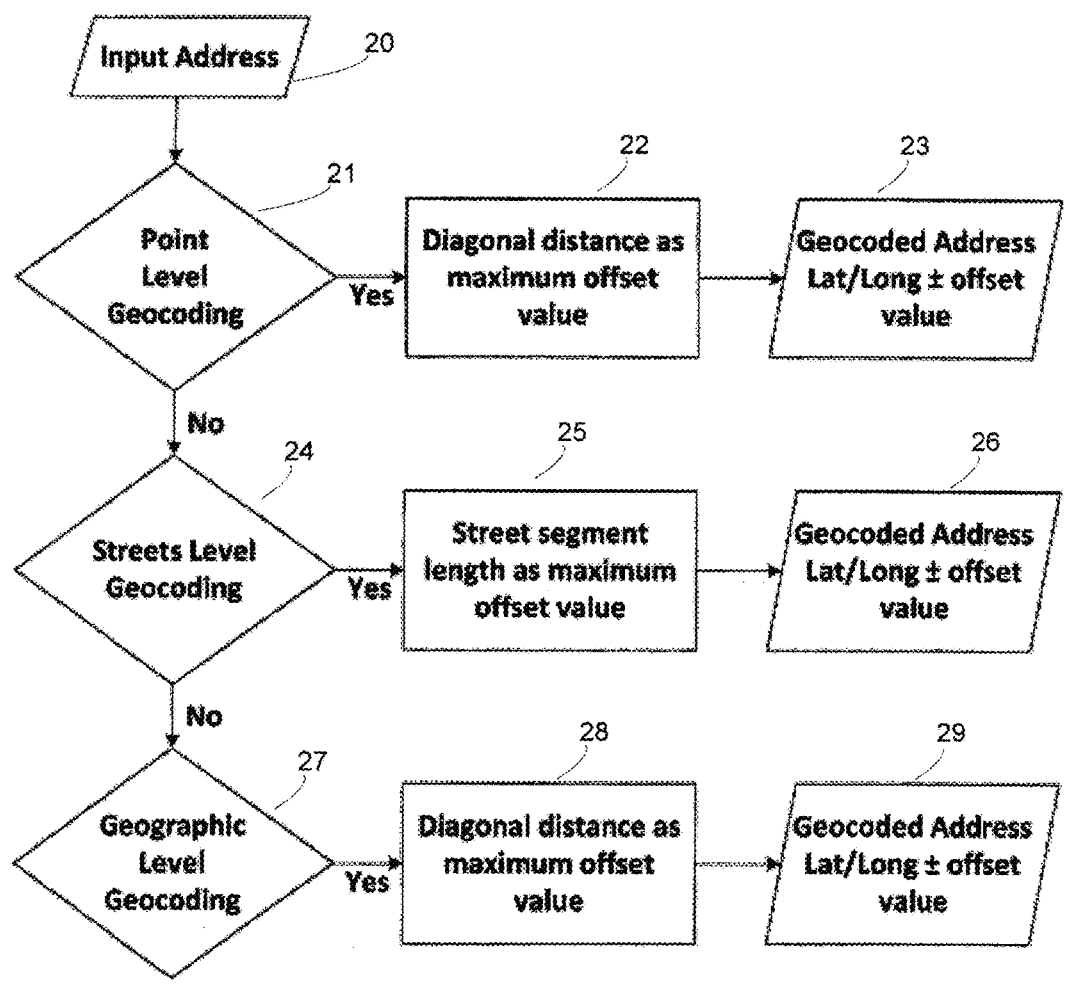
FIG. 2 is a flow chart of the operation of the system for determining offset values for different geocoding datasets.

Reference is now made to FIG. 2, showing the process involved in determining offset values for geocoded locations. An address is input at block 20. At step 21, if the input address match is available at rooftop point level, rooftop point level geocoding. Along with geocoded location, distance offset is calculated i.e. based on diagonal distance in block 22. Step 23 depicts the step of the final result of rooftop level match results being presented with the corresponding offset values, in accordance with an embodiment of the invention.

If the input address fails to provide rooftop level match at step 21, it falls to street line match at step 24. The street segment centroid coordinates, or interpolation based coordinates, are generated in step 25, along with offset distance values in accordance with an embodiment of the invention. This can improve upon the traditional method of just providing a pair of coordinates, and generate a more precise set position of geocoded location for the input address.

If the input address match is failed even at street level at step 24, the analysis falls to postal or geographic level match results performed in step 27. Along with geocoded location, diagonal distance offset is calculated in step 28. Step 29 illustrates the step of presenting the final result of postal/geographic level match results with offset values, in accordance with an embodiment of the invention.

Figure 3:
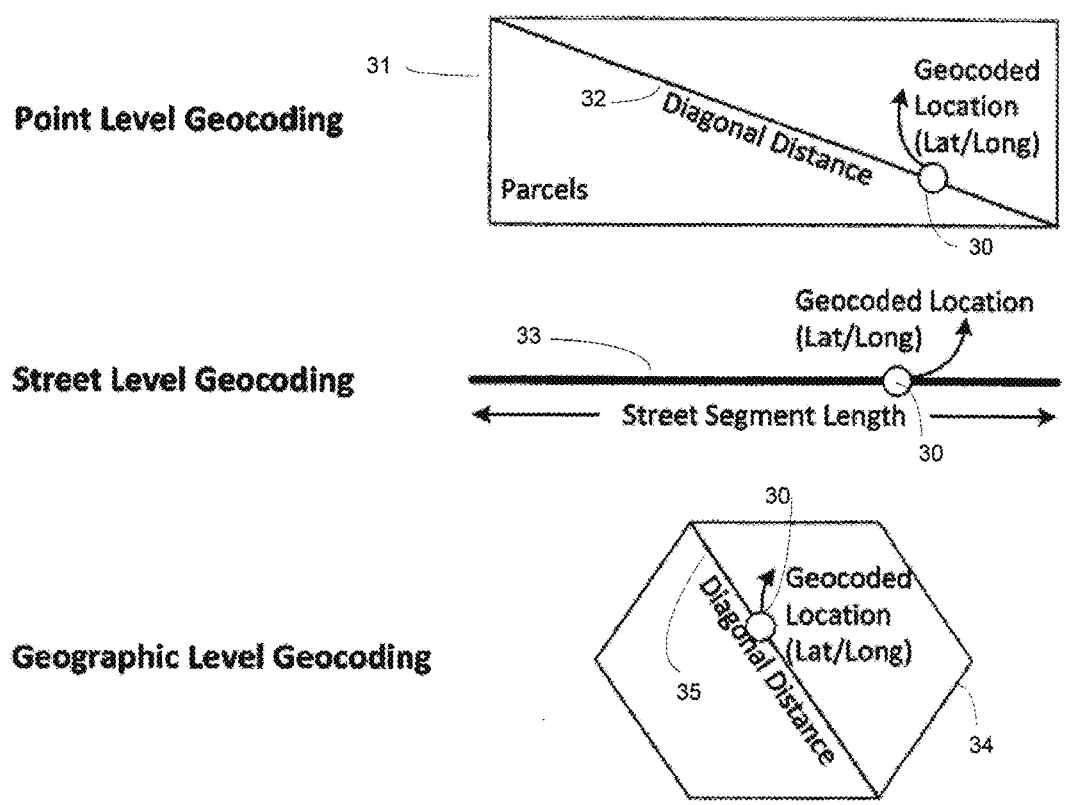
FIG. 3 depicts exemplary geographic characteristics that are used for determining offset values.

FIG. 3 illustrates embodiments for using geographic characteristics of the respective datasets to determined distance offset values. For point level geocoding example, geocoded location point 30 is located within a parcel 31. The offset distance for this example is a function of the diagonal distance 32 across the parcel. In a second example in FIG. 3, geocoded location point 30 is located using street segment data on segment 33. In that example, the offset distance is a function of the segment 33 length. In a third example, geocoded location point 30 is located within a polygonal geographic region 34. In this third example, the offset distance is a function of the maximum diagonal distance 35 across the polygonal shape of the region 34.

Figure 4A:
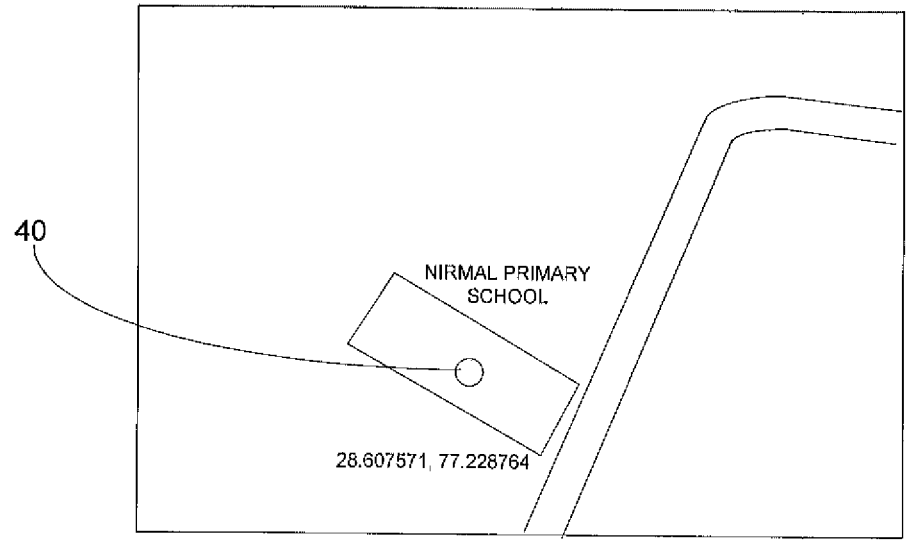
FIGS. 4a and 4b show exemplary geocoding outputs that without and with offset values included.

FIG. 4a depicts an example of a geocoding output 40 using prior art techniques. In this example, the location of an address is found to be at a particular set of coordinates, as depicted. However, in this prior art technique, a user might want to know a degree of accuracy for this result because they want to be sure that the location is within a defined region that receives service from a local firehouse. In this prior art example, there is no way to check for a confidence level on this question.

Figure 4B:
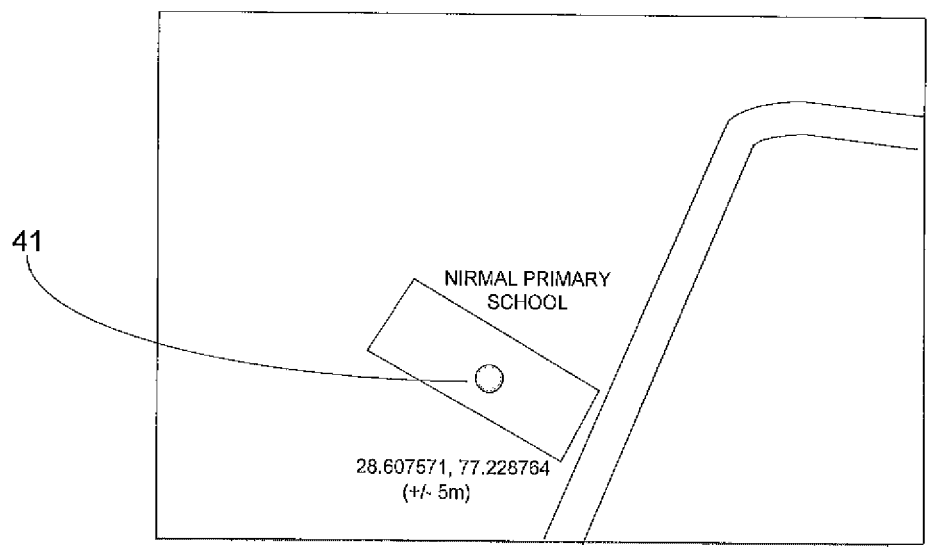

FIG. 4b depicts a geocoding output 41 that addresses the problem identified above. In this case, output 41 includes coordinates along with an offset distance of +/−5 m. Thus the user can see that there is a high degree of accuracy in this geocode result, and the user should have greater confidence that the location is within the region of interest, even if the border of the region is in the vicinity. The end result of the invention's geocoding process is the geocoded location with offset values that better approximates the position of the input address based on the combination of geocoding algorithm and distance offset functions.

The term "data" as used herein is a broad term. It encompasses both partial and complete input location data and longitude and latitude inputs in decimal degrees. Also, address data is intended to include specific addresses such as a house address or a feature such as an onramp for a freeway or a highway. Additionally, street segment or street segment centerline datasets need not necessarily be in the center of the street.

While the present invention has been described in connection with what is presently considered to be the most practical and preferred embodiments, it is to be understood that the invention is not limited to the disclosed embodiment, but, on the contrary, is intended to cover various modifications and equivalent arrangements included within the spirit and scope of the appended claims.

What is claimed is:

1. In an automated computer geocoding system having a plurality of geographic datasets stored in a computer memory, wherein the geographic datasets include at least one point level dataset, at least one street level dataset, and at least one geographic level dataset, a method for providing geocoded data with positional accuracy indicators, the method including:
   receiving an address to be geocoded;
   determining whether corresponding geocode data for the address exists in one or more of the geographic datasets;
   selecting the geographic dataset that provides a highest level of resolution and that also includes corresponding geocode data for the address;
   outputting a geocoded coordinate for the address as found in the geographic dataset that was selected;
   calculating an offset value for the geocoded coordinate that is output, wherein the offset value is determined as a function of geographic characteristics of the geographic dataset that was selected; and
   outputting the offset value for the geocoded coordinate that was output.

2. The method of claim 1 wherein the geographic dataset selected in the selecting step is a point level dataset and the offset value is calculated as a function of a diagonal distance across a parcel that encompasses the geocoded coordinate.

3. The method of claim 1 wherein the geographic dataset selected in the selecting step is a street level dataset and the offset value is calculated as a function of a street segment length of a street segment that includes the geocoded coordinate.

4. The method of claim 1 wherein the geographic dataset selected in the selecting step is a geographic level dataset and the offset value is calculated as a function of a diagonal distance across a defined geographic level region that includes the geocoded coordinate.

5. An automated computer geocoding system having a plurality of geographic datasets stored in computer memory, wherein the geographic datasets include at least one point level dataset, at least one street level dataset, and at least one geographic level dataset, for providing geocoded data with positional accuracy indicators, the system including a processor configured for:

receiving an address to be geocoded;

determining whether corresponding geocode data exists for the address in one or more of the geographic datasets;

selecting the geographic dataset that provides a highest level of resolution and that also includes corresponding geocode data for the address;

outputting a geocoded coordinate for the address as found in the geographic dataset that was selected;

calculating an offset value for the geocoded coordinate that is output, wherein the offset value is determined as a function of geographic characteristics of the geographic dataset that was selected; and outputting the offset value for the geocoded coordinate that was output.

6. The system of claim 5 wherein the geographic dataset selected in the selecting step is a point level dataset and the offset value is calculated as a function of a diagonal distance across a parcel that encompasses the geocoded coordinate.

7. The system of claim 5 wherein the geographic dataset selected in the selecting step is a street level dataset and the offset value is calculated as a function of a street segment length of a street segment that includes the geocoded coordinate.

8. The system of claim 5 wherein the geographic dataset selected in the selecting step is a geographic level dataset and the offset value is calculated as a function of a diagonal distance across a defined geographic level region that includes the geocoded coordinate.

* * * * *